Feb. 10, 1931.   L. GRANGES   1,792,160
RESILIENTLY SUSPENDED CHASSIS FOR MOTOR VEHICLES AND SUCH LIKE
Filed July 26, 1927    6 Sheets-Sheet 1
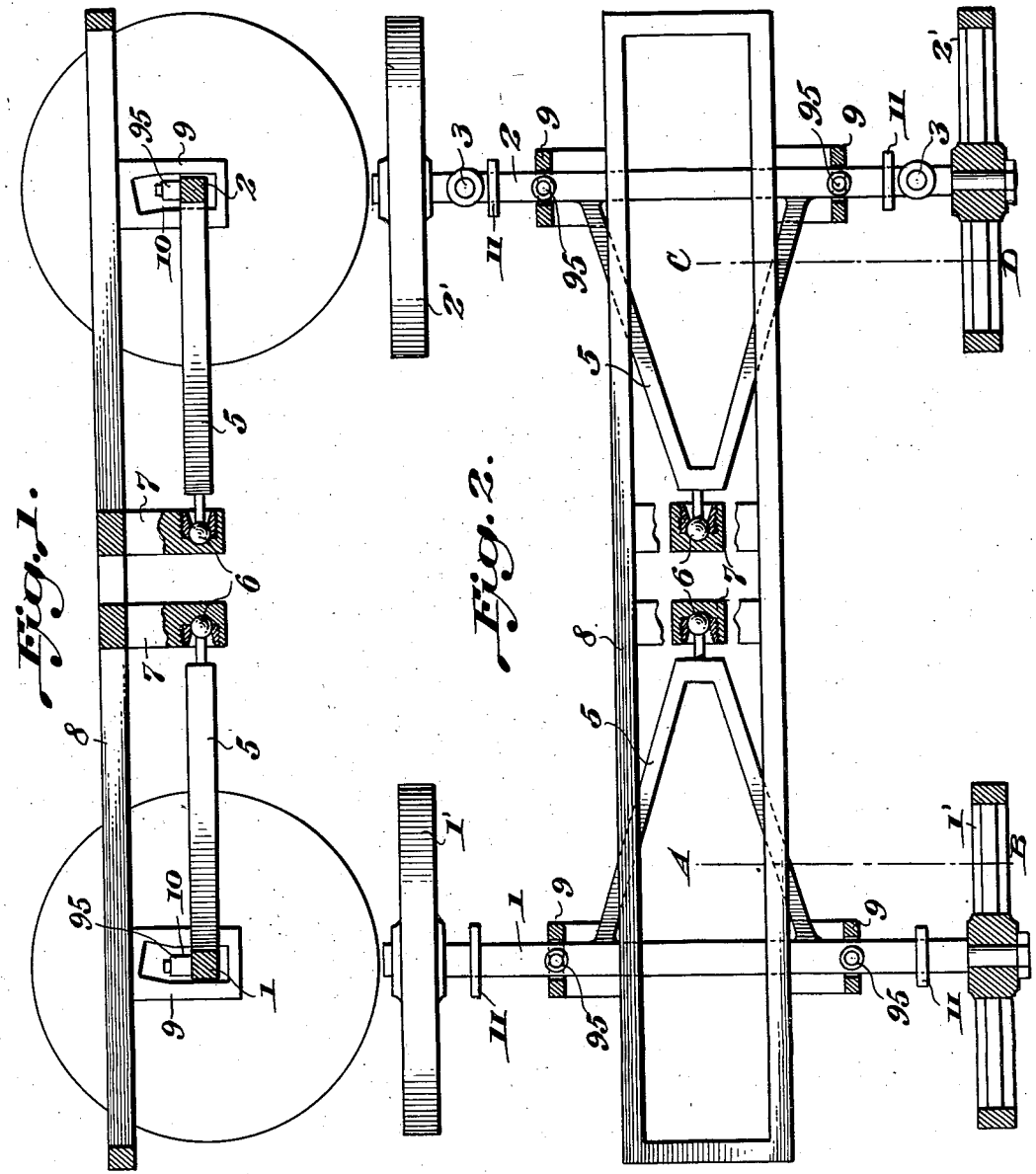
Inventor,
Louis Granges,
By Emil Bonnelycke
Atty.

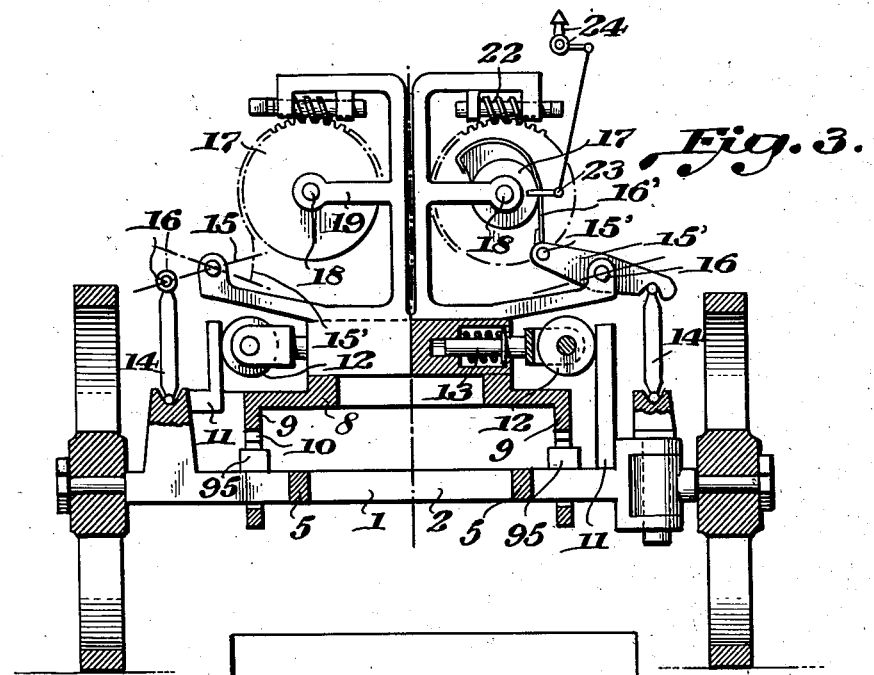
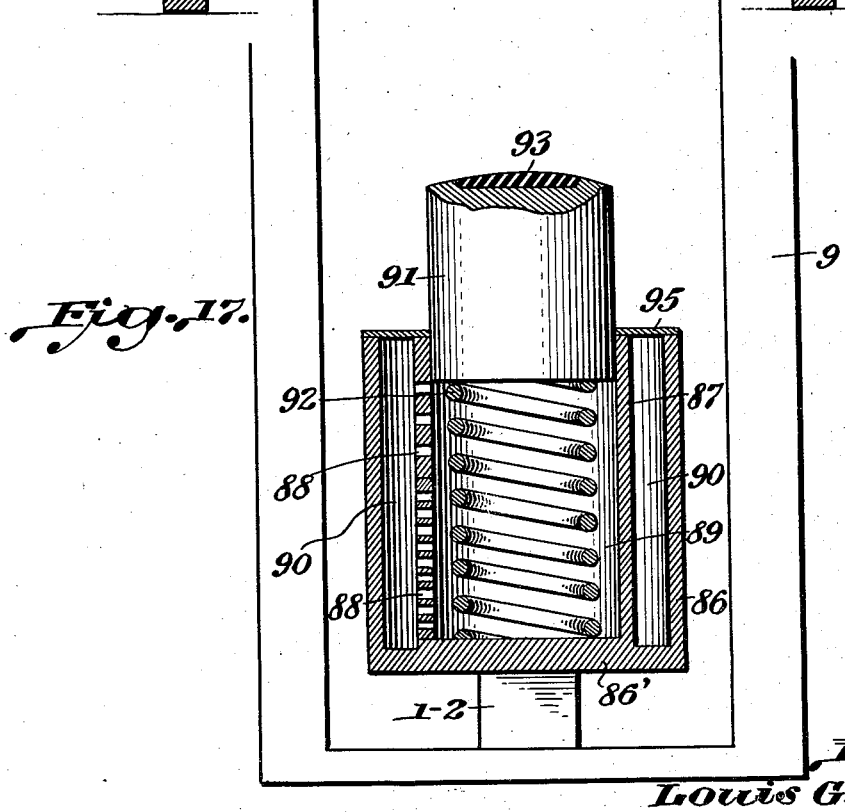

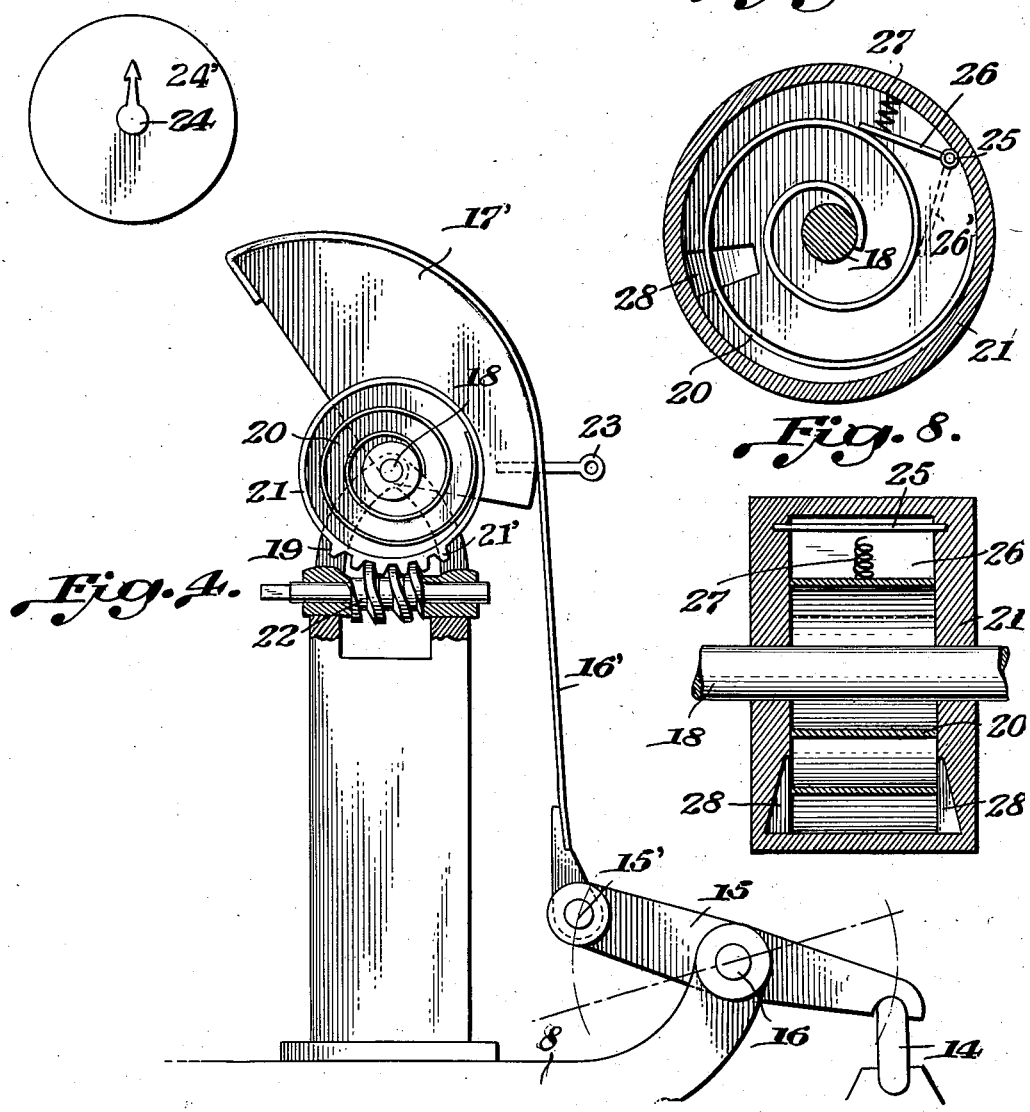

Feb. 10, 1931. L. GRANGES 1,792,160
RESILIENTLY SUSPENDED CHASSIS FOR MOTOR VEHICLES AND SUCH LIKE
Filed July 26, 1927 6 Sheets-Sheet 4
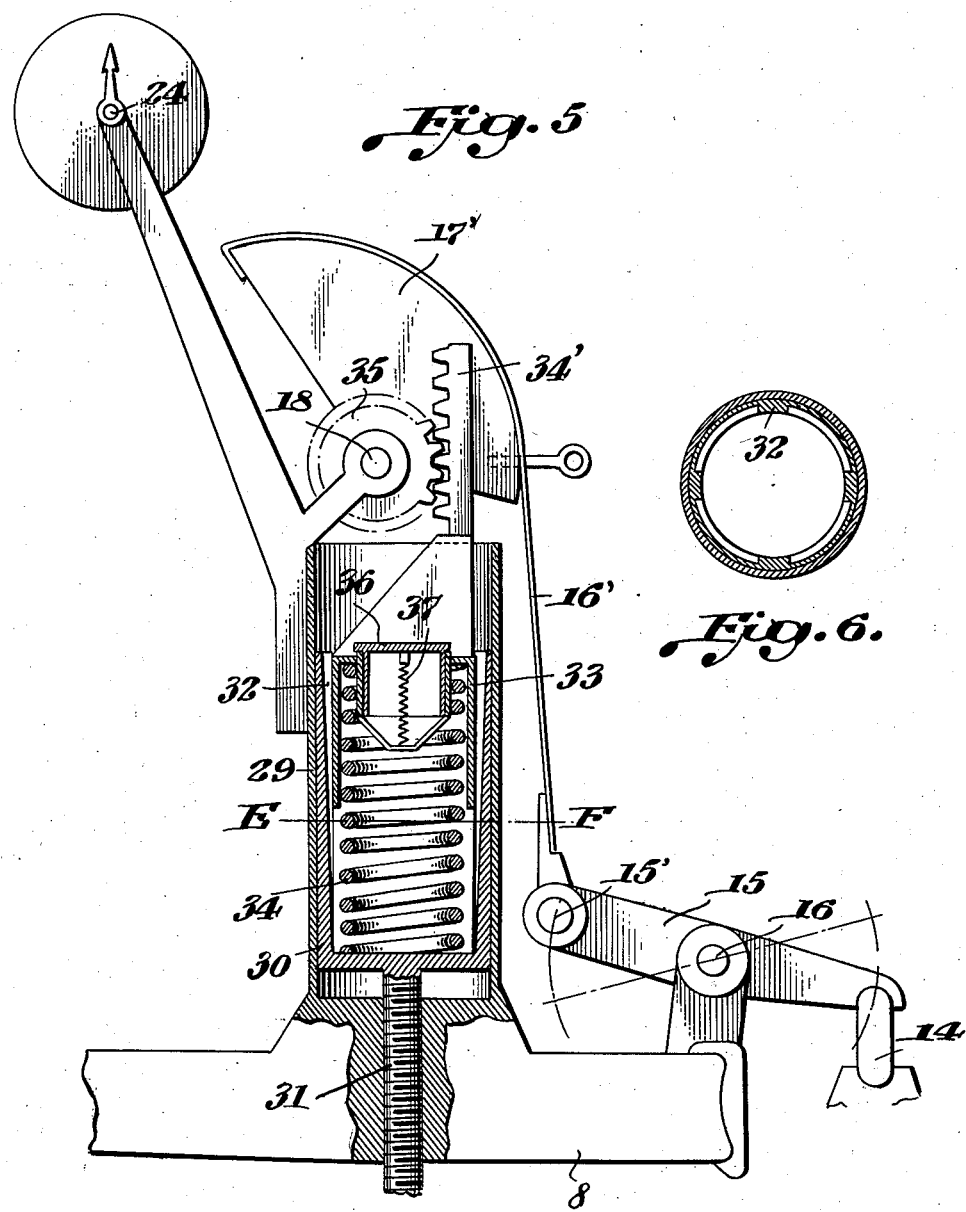
Inventor;
Louis Granges,
By Emil Bönnelyche
Atty.

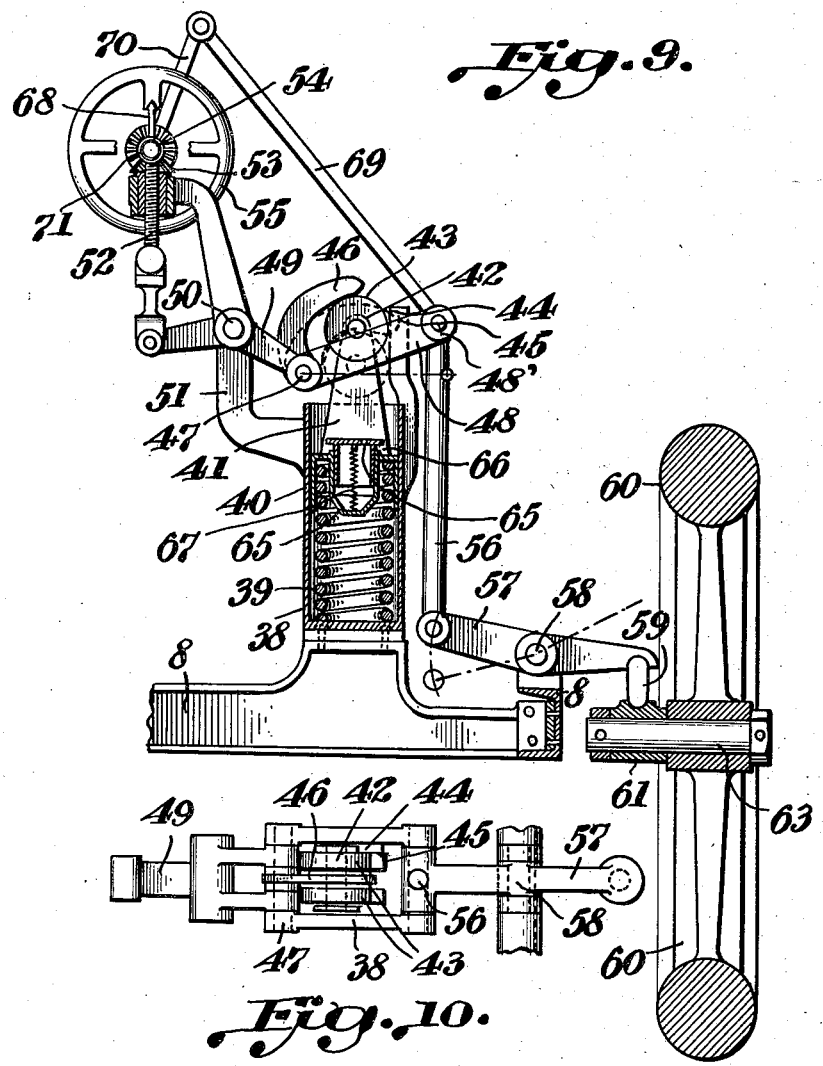

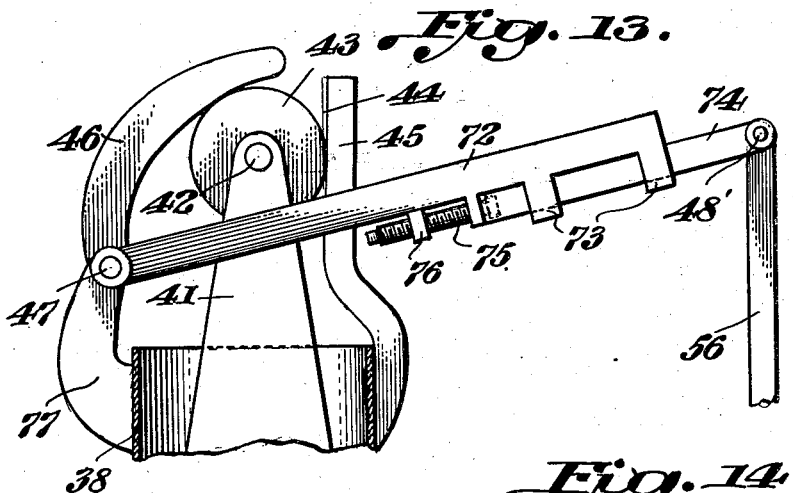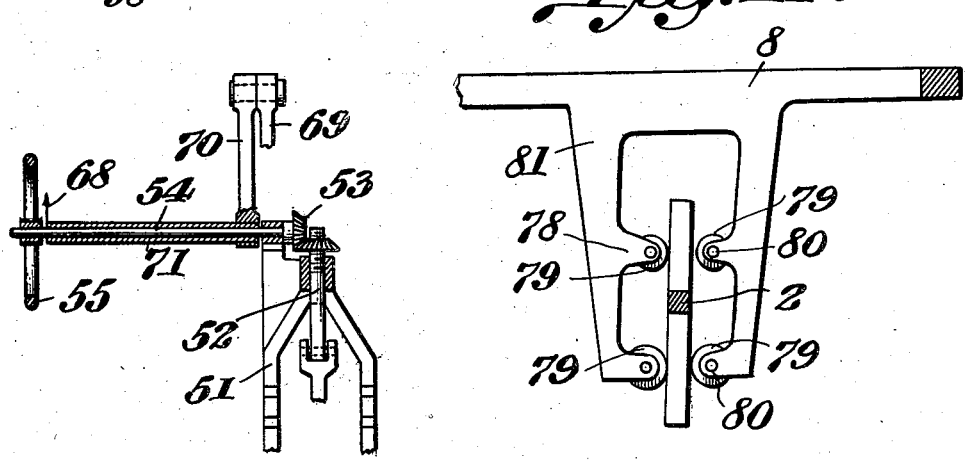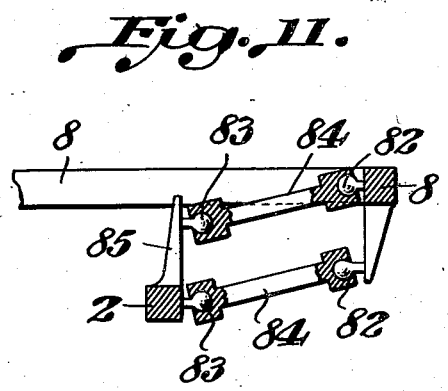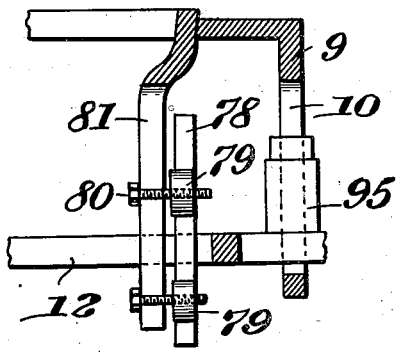

Patented Feb. 10, 1931

1,792,160

UNITED STATES PATENT OFFICE

LOUIS GRANGES, OF PARIS, FRANCE

RESILIENTLY-SUSPENDED CHASSIS FOR MOTOR VEHICLES AND SUCH LIKE

Application filed July 26, 1927, Serial No. 208,571, and in France July 27, 1926.

The object of my invention is to provide an improved device for effecting connection between the chassis of a motor car and the axles thereof, combined with a resilient suspension of the chassis. Means are also provided, by preference, to deaden or brake any bumping of the said suspension and to absorb and cushion the shocks incidental to sudden and abrupt vertical movements of the axles due to road irregularities.

According to my invention, connection of the chassis to the axles is effected in the following manner:

(a) Longitudinal connection of the chassis with the axles.

Each axle carries a reach which is secured thereto at one end and is connected at the other end, by means of a ball-and-socket joint, to a depending block fastened to the chassis on the longitudinal axis of the latter, so that each axle is thus able to move both vertically and transversely relatively to the chassis and can, moreover, remain parallel with or assume an inclined position with respect to the horizontal plane of the chassis during such movement.

(b) Cross connection of chassis with axles.

This connection is obtained by means of lateral guides, resilient or not, designed to oppose any substantial shifting of the chassis with respect to the axles.

(c) Vertical connection.

Thrust blocks, yielding or not, and shock absorbers adapted to limit the up and down movements of the chassis relative to the axles are utilized for this purpose, as well as a resilient suspension device reacting on each axle end and, consequently, on each wheel; each such device comprising a resiliently reacting member the power of which can be varied. This device receives the reaction of the wheels through cams, cranks, or beams having arms of variable or fixed length permitting reactions of constant or variable value to be exerted on the wheels. The whole device is so constructed as to permit the suspended part, through mechanical compression or tension of the resiliently reacting member, and while stationary or during working, to travel to any extent within the limits of the maximum travel provided for, and this regardless of load variations; said device comprising an indicator of the relative positions of the bearing points and of the suspended part.

Another characteristic of the improved resilient suspension device is the fact that its essential elements permit the sudden movements of the chassis, due to abrupt shocks, to be retarded or braked when the device has been adjusted to a tension greater than that suitable to balance the inertia of the chassis; this braking effect being obtained by introducing a fluid into the casing containing the resilient reaction member, such, for instance, as a spring, through one or several valves offering a passage permitting the fluid to escape without any appreciable resistance from the zone of said casing, the section of which passage decreases during the travel that brings the chassis closer to the axle. The braking begins at the very end of the travel, at which point the valve closes and a vacuum is produced in the above-mentioned casing zone consequent upon its increase in volume during the back-jump; flow-passages, suitably arranged for return of the fluid to the zone from which it was expelled, determining by their constant or variable section the speed of the inertia movement.

In the accompanying drawings:

Figure 1 is a side elevation, partly sectional, of the chassis of a vehicle;

Fig. 2 is a plan view, partly sectional, of the chassis;

Fig. 3 is a vertical cross-section, half on line A—B and half on line C—D of Fig. 2;

Fig. 4 is a sectional view of one of the resilient suspension devices;

Fig. 5 shows a modification of Fig. 4;

Fig. 6 is a horizontal section on line E—F of Fig. 5;

Figs. 7 and 8 are vertical sectional views, taken at right angles to each other, of a braking device for retarding the backward or upward movement of the chassis;

Figs. 9, 10, 11 and 12 show a modification of Fig. 5;

Fig. 13 is an enlarged detail, partly in section, of a modification of Fig. 9;

Figs. 14 and 15 show in side elevation and vertical section a possible longitudinal connection of the axles with the chassis;

Fig. 16 shows in section another possible longitudinal connection of the axles with the chassis; and Fig. 17 is a sectional view of a buffer adapted to absorb and cushion the vertical movements of the axle.

Referring, first to Figs. 1, 2, 3 and 17, 1 and 2 indicate, respectively, the rear and front axles, and 3 the steering spindles connected to the latter axle. Each axle has secured to it a V-shaped reach 5 provided at its apex with a ball member 6 that fits in a socket formed in a depending block 7 secured to the chassis 8, said ball-and-socket joints determining in the longitudinal direction the position of axles 1 and 2 with respect to chassis 8 while permitting the latter to move toward or from said axles which are themselves permitted to assume an inclined position relative to the chassis.

Chassis 8 carries cheeks 9 formed with vertical slots 10 through which the axles 1 and 2 pass. To cushion their travel in these slots, the axles may be provided with resilient shock absorbers 95 as, for instance, of the type shown in detail in Fig. 17. Such a shock absorber may comprise outer and inner cylinders 86 and 87, arranged coaxially and in spaced relation to provide an intermediate annular chamber 90; said cylinders having a common bottom wall 86' which is integral with them and which rests on and is secured to the corresponding axle. The inner cylinder has its wall perforated, as indicated at 88, to secure communication between its interior 89 and the chamber 90; and in this cylinder is slidably fitted a plunger 91 that works in opposition to an expansible coil spring in the cylinder, the plunger being provided at its projecting upper end with a resilient buffer 93.

Each axle carries two guiding pieces 11 on each of which runs a roller 12, itself carried by a spring-loaded fork 13 mounted in an opening in chassis 8. Said rollers 12 maintained the transverse position of the chassis relative to the axles; and they, as well as the treads of guides 11, may be made of resilient material.

Chassis 8 bears on axles 1 and 2 through the intermediary of vertical connecting rods 14 which transmit the reaction to beams 15 rocking on spindles 16 rigidly connected with the chassis. These beams 15 transmit their reaction through spring strips 16' to spring-acting suspension devices generally designated 17; each such device embodying a rotary drum 21 (Fig. 7) loosely mounted on a spindle 18 which is journaled in a support 19 rigidly secured to the chassis. A spiral spring 20 is disposed within drum 21 and has one of its ends secured to spindle 18 while its other end is secured to the inner wall of the drum, the latter being provided externally with gear teeth 21' in mesh with a worm 22 journaled in support 19. The spindle 18 carries, rigidly secured to it, a cam 17' to which one end of the spring strip 16' is fastened, the other end of the strip being fixed to a spindle 15' mounted in the inner end of the rocking beam 15; that is to say, the opposite end to that engaged by rod 14. This cam has atached to its edge a lateral projection or lug 23 which is suitably connected to a pointer 24 movable over a scale or dial 24'.

The operation of the invention, so far as described, is substantially as follows: Assuming that the rear axle 1 is driven by the motor of the car, this axle will exert a forward thrust upon the chassis 8 through the agency of its V-shaped reach 5 and the ball-and-socket connection between the latter and the adjacent block 7; and the chassis itself, in turn, will exert a similar thrust upon the front axle 2 through the corresponding front parts 7, 6, 5. Any appreciable lateral movement of the chassis will be checked by the rollers 12 which travel vertically along the inner faces or treads of the guides 11 secured to the axles; the spring-loaded carriers 13 of said rollers yielding when any endwise shifting of the corresponding axle occurs and serving also to deaden the effects of such shifting when sudden or intense.

These rollers, moreover, insure perfect horizontal steadiness of the chassis against side stresses, particularly when the car is taking a curve at high speed, consequent upon the possibility of so positioning the rollers that their axes and, hence, their points of contact with the guides 11 lie in, or sligthly above, the horizontal plane passing through the center of gravity of the chassis. It will be apparent, therefore, that if said rollers are positioned below such plane, then when the car is taking at high speed a curve which will cause the rollers on the outside of the curve to exert a thrust against the respective guides, there will result an inclination or banking of the chassis toward the center of the curve, which is contrary to what takes place with existing cars.

As to the resilient suspension devices 17, it will be apparent that after the chassis 8 has been laid upon the axles and connected therewith in the maner previously explained, the operation of said devices will act to raise the chassis above said axles. This is effected, in the case of each drum, by rotating the worm 22 by any suitable means and thereby turning drum 21 counter-clockwise (Fig. 4); such turning movement coiling up or tensioning spring 20 which, in consequence, acts to turn spindle 18 and its cam 17'. The latter, in its rotation, pulls upward on spring strip 16' which thereupon lifts the inner end of beam 15, with the result that the outer end of the beam presses downward on rod 14, such pressure being imposed upon the adjacent axle. This tends to lift the chassis, as will be understood, the extent of movement being indicated by the pointer 24 on dial 24'.

It will likewise be apparent, of course, that by employing mechanical devices of known character, all four worms 22 can be connected for operation from a single point, while the dials 24 can likewise be grouped together adjacent such point, so that it will be possible from the aforesaid point to ascertain and, if necessary, rectify the vertical position of the chassis with relation to the axles, particularly if any change in the load on the chassis is made.

By varying the shape of cam 17', the lifting action which it exerts on strip 16' and, hence, on beam 15 can be made constant or variable. As a matter of fact, it will be seen from Fig. 4 that the cam can be so shaped that at the tangent point of strip 16' and said cam, the effort produced by spring 20 at such point will be equal to or greater than the tension exerted on said strip by the weight of the chassis at any point in the upward travel of the latter. Hence, it is possible to build a car the chassis of which will be practically unaffected by either rapid or slow shifting movements of the axles in vertical direction due, for instance, to travel of the car over rough or uneven roads. If the cam is so constructed that spring 20 has a reaction equal in extent to, or very slightly greater than, the weight of the chassis, any load added to or removed from the chassis will react on the suspension devices 17, and, according to the readings of the dials, worms 22 can be operated to restore the chassis to its normal position with relation to the axles.

In order to retard or brake the backward movement of the chassis, suitable devices may be employed, one form of which is illustrated in Figs. 7 and 8. It will be seen therefrom that drum 21 is provided with an internal spindle 25 whereon is pivotally mounted a plate or valve 26 acted on by an expansible spring 27 which presses it against the adjacent convolution of the spiral spring 20. This plate can act in either direction against said spring 20—in other words, it can occupy either the full-line position 26 or the dotted-line position 26' represented in Fig. 7—and both it and the spring have a width such that they are in frictional engagement at their side edges with the adjacent inner faces of the side walls of the drum, which walls are provided at a number of points with pairs of opposite recesses 28. The downward movement of the chassis is accompanied, of course, by a counter-clockwise movement of the rocking beams 15 about their pivots 16 and, hence, by a downward pull on strips 16', since the load of the chassis is imposed at this time upon the outer arms of the beams and the rods 14. In consequence, the cams 17' are rotated clockwise and, in turn, rotate their spindles 18, thereby winding up the springs 20 from their inner ends.

Each drum 21 is filled with a fluid or liquid of some character; and when spring 20 is contracted by the clockwise rotation of cam 17' and spindle 18, the volume of that portion of the interior of said drum which is confined between the plate 26 and the convolutions of the spring is decreased, with the result that the fluid is subjected to pressure, the excess fluid being forced out through the recesses 28 and past said plate into the zone or region outside the spring. At the end of the downward movement of the chassis, regardless of its extent, the plate 26 returns to its normal closed position, since the pressure thereon is relieved, and the fluid can then pass back into the inner space or zone defined by the spring 20 by way of the recesses 28 alone. This inward or return passage of the fluid takes place, of course, during the backward or upward movement of the chassis, when the counter-clockwise rotation of the drum effects expansion of the spring with resultant compression of the fluid against the peripheral wall of the drum. The radial length of the recesses, as well as their cross-sectional area, will naturally affect the flow of the fluid and, consequently, the reaction of the spring during the upward movement of the chassis, decreasing the speed of such movement; this being especially true when the cam 17' is so shaped as to cause reactions which substantially overbalance the weight of the chassis.

Reverting to the shock absorber 95 illustrated in Fig. 17, the purpose thereof is to absorb the kinetic energy of the axle when an unevenness of the road is so marked that one of the wheels running over it is bumped to such a height that the normal travel allowed between the axles and the chassis is insufficient. Plunger 91 is thus brought into contact with the top wall 94 of slot 10, with the result that it is forced backward into cylinder 87 and compresses the air or other fluid or liquid with which the interior 89 of said cylinder has previously been supplied, thereby forcing said fluid out through holes 88 into chamber 90. As the plunger descends, it successively closes the holes 88 so that the fluid will oppose a gradually-increasing resistance to the movement of the plunger, due to the decreasing number of holes through which said fluid can pass to chamber 90. The holes 88 are so arranged that at the end of the relative travel allowed between the axle and the chassis, the resistance will be such that the entire kinetic energy of the axle will have been absorbed. During the return movement of the parts, spring 92 will cause the plunger to move upward and outward of cylinder 87, and the fluid forced into chamber 90 will thus be returned to the interior 89 of said cylinder.

In the foregoing, one practical embodiment of my invention has been described. As a matter of course, modifications may be designed which will in no way alter its characteristics.

As regards the resilient suspension device, it will be apparent that, irrespective of its structural details, this device will be adapted to act in conjunction with a cam and rocking beam in a manner to obtain the same results as those described above by interposing between the resilient device and the axle mechanical means suitable to transform the motion (whether curvilinear or rectilinear) of the movable element of the device into a circular motion about the axis of rotation of the cam; the device can act in conjunction with cranks or beams co-operating to produce the cam effect, said cranks or beams being so arrangeable mechanically that the relation of their leverage will be variable as desired. Furthermore, a variable pressure or tension calculated to increase or decrease its reaction can be imposed mechanically on the aforesaid movable element.

Similarly, as regards braking the backward or upward movement, any suitable resilient device can be employed which will produce, through its motion, a compressed or expanded zone which, during the backward movement, will, by means of a fluid and through suction or compression of said fluid and through special flow passages, cause a decrease in the speed of such movement.

The device illustrated in Figs. 5 and 6 is a modification wherein the resilient effects are obtained by means of an expansible coil spring 34 which replaces the spring 20 of Fig. 4, but produces the same results as that spring. This spring 34 is disposed within a vertical cylinder 30 and acts at one end against the bottom thereof and at the other end against a piston 33 fitting in the upper part of the cylinder in slidable contact with a set of tapered vertical ribs 32 with which said cylinder is provided. As a matter of fact, the aforesaid upper part of the cylinder is itself tapered or flared (see Fig. 5); and since the ribs 32 are comparatively narrow, channels 32' (Fig. 6) will be produced between the ribs which will permit the passage of air or other fluid or liquid into or out of the cylinder, as subsequently described.

Cylinder 30 fits within an outer cylinder 29 which is rigidly connected to the chassis 8, the latter having a threaded opening through which extends a screw 31 attached at its top to the bottom of cylinder 30, so that by turning said screw in the proper direction the position of said cylinder 30 can be adjusted vertically as desired, thereby regulating the tension of spring 34. A vertical rack 34' is fixed to the top of piston 33 and meshes with a pinion 35 securely mounted on spindle 18, to which latter, as before, the cam 17' is fastened. Finally, a valve 36 is slidably mounted in an opening in the top of the piston and is normally held in closed position by a spring 37.

The operation, as will be understood, is virtually identical in its main aspects with that previously described in connection with Fig. 4. By adjusting screw 31 to raise the inner cylinder 30 and thereby increase the tension of spring 34, the latter is caused to force piston 33 and rack 34' upward, thus rotating pinion 35 and cam 17' counter-clockwise and, in consequence, exerting an upward pull on spring strip 16'. This upward pull rocks beam 15 clockwise, which brings about the lifting movement of the chassis.

In this construction likewise, the braking or retarding action is effected by means of the valve, which latter opens automatically under the influence of the lift of the axle. This movement of the axle, which entails downward movement of the chassis, produces a counter-clockwise rocking movement of beam 15, followed by a downward pull on strip 16' and clockwise rotation of cam 17' and pinion 35, the last-named part forcing rack 34' and piston 33 downward. During the descent of the piston, it compresses the fluid beneath it and, at the same time, gradually closes the lower ends of the channels 32', some of the fluid escaping through the latter before they are finally closed. The pressure of the fluid increases, of course, as the piston descends and thus opposes an increasing resistance to its movement; the pressure ultimately reaching a point where it lifts valve 36 and permits the fluid to escape. Hence, when the piston reaches the end of its downward movement, the valve is closed by its spring 37. During the succeeding upward movement of the piston, produced by the expansion of spring 34, it tends to create a suction or vacuum action beneath it which draws the fluid back into cylinder 30.

As regards the further modification represented in Figs. 9–12, 38 indicates a cylinder rigidly fixed to chassis 8 and containing a spring 39 which bears against the bottom of said cylinder. This spring 39 bears at its upper end against a piston 40 which carries a cap or projection 41; the latter itself carrying a spindle 42 on which three rollers 43 freely rotate. The two outside rollers travel along the edge faces 44 of fixed guides 45 secured to cylinder 28, while the central roller transmits the drive from spring 39 to a cam 46 fixed to a spindle 47 to which an arm 48 is also fixed. Spindle 47 rotates in a beam 49 which rocks on a spindle 50 rigidly mounted in a support 51 which is itself secured to cylinder 38 and, hence, is rigidly connected with chassis 8.

The rocking motion of beam 49 is controlled by a screw 52 operated, for instance, by means of bevel gears 53, a shaft 54 whereon one gear is mounted, and a hand wheel 55 for turning said shaft. The other end of arm 48 is connected, through a pin or pivot 48', to the upper end of a rod 56, the lower end of which is pivoted to the inner end of a beam 57 mounted to rock on a central pin or pivot 58 attached to the chassis 8, while the outer end of the beam bears on a rod or link 59 which transmits the stress to the adjacent wheel 60 through an intermediate arm 61. The latter is connected at one end to a pivot 62 (Fig. 12) attached to the chassis and carries at its other end the spindle 63 whereon wheel 60 revolves.

The piston 40 is provided with a valve 64 having apertures 65, and is normally held in closed position on its seat 66 by a spring 67. A pointer 68 indicates the various vertical positions of the hub of wheel 60 with respect to the chassis, being actuated by suitable transmission gear, as, for instance, connecting rods 69 and 70, the former attached to pivot 48' and the latter to the sleeve 71 which carries the pointer and which is loose on shaft 54.

The operation is again substantially the same as before, as will be seen from the following:—The upward movement of wheel 60 produced by road irregularities is transmitted through parts 59, 57, 56 and 48 to spindle 47 and its cam 46, the latter being rocked thereby in a clockwise direction and, in consequence, depressing the central roller 43 and, hence, the piston 40 which, in its turn, compresses spring 39. During its descent, the piston compresses the fluid beneath it and is opposed more and more as the pressure increases, thus producing a braking action. The valve 64 opens automatically when the pressure becomes high enough, and closes again at the end of the down-stroke of the piston which thereafter returns to its normal upper position. When a new load is imposed upon the chassis, the reaction of wheel 60 will obviously be increased; the desired absolute or relative balance being restored thereafter by manipulation of the hand wheel 55. As will be understood, this operation has the effect of changing the position of spindle 47, with a resultant change in the action of cam 46 on the central roller 43; and there is also an adjustment of the position of arm 48 and, consequently, of the parts 56 and 57 connected with the same, so that the reaction of wheel 60 is likewise varied.

All the foregoing explanations concerning the device shown in Fig. 9 make it apparent that the same results are obtained with that device as with the device shown in Fig. 5; but while with the latter device increases of load on chassis 8 are compensated by the stress of screw 31 on spring 34, with the device shown by Fig. 9 such compensation is obtained through variation of the position of spindle 47 which thus renders arm 48 a lever arm the distances of the application points of which are variable.

A possible modification of the device shown in Fig. 9 enabling variation of the stresses on the application points of lever arm 48 acting on cam 46, is illustrated in Fig. 13. The arm 48 is here shown as made in two parts, the inner part or member 72 being fixed to spindle 47 and formed with two guides 73 in which the outer member 74 is slidably fitted. The latter member, which is pivotally connected at its outer end at 48' to the upper end of rod 56, carries at its inner end a screw 75 which passes through a depending eye 76 on member 72. By rotating this screw, the length of the arm 48 can be adjusted at will, with a resultant reaction on parts 56 and 57. The spindle 47, in this construction, is rotatably mounted in a support or bracket 77 fixed to cylinder 38.

As to the longitudinal connection of the chassis, two embodiments have been illustrated, the first in Figs. 14 and 15. Each axle carries, on either side of the transverse axis of the chassis 8, a part 78 that serves as a guide or base for rollers 79 rotating on spindles 80 attached to cheeks 81 carried by the chassis. Rollers 79 may be made of resilient material, or they may be mounted in spring-loaded carriers analogous to the carriers 13 for the wheels 12 in Fig. 3. With this arrangement, an efficient longitudinal connection of the chassis with the axle is assured, while still permitting the axle to move parallel with or at an angle to the plane of the chassis.

The second embodiment is illustrated in Fig. 16, and comprises, on each side of the transverse axis of the chassis, a parallelogram comprising two members 84 connected by ball-and-socket joints 83 to axle 2, and by similar joints 82 to the chassis; one of the joints 83 being immediately attached to a resilient member 85 fastened to the axle but capable of yielding in the longitudinal direction of the chassis, so that said axle can thus shift vertically and transversely but is held against longitudinal shifting.

When the axle moves vertically, while remaining parallel to the chassis 8, the two parallelograms work normally; but if it becomes inclined relatively to the plane of the chassis, it will be seen that in each parallelogram the line passing through the axes of joints 83 is not shifted to the same extent, whereby a twisting stress is imposed on the axle. The resilient deformation of parts 85 is provided for the purpose of avoiding twisting of the axle. It will also be apparent that the same result could be obtained by so arranging one element of each parallelogram that it will insure the resilience desired to avoid twisting of the axle. Both embodiments, therefore, come within the scope of my invention.

I claim as my invention:—

1. In a vehicle, the combination, with front and rear axles, and a chassis overlying the same, of a set of resilient suspension devices for supporting the chassis from the axle ends; each suspension device embodying a rocking beam, a thrust rod interposed between one end of the beam and the adjacent axle end, a cam, and a spring strip connecting the cam and the other end of the beam.

2. In a vehicle, the combination, with front and rear axles, and a chassis overlying the same, of members disposed longitudinally of the chassis for connecting the latter with the axles, a set of resilient suspension devices for supporting the chassis from the axle ends and enabling relative vertical movement between said chassis and axles, and coacting parts on the chassis and axles for yieldingly holding the chassis against lateral movement during such vertical movements, the parts on the chassis being spring actuated.

3. In a vehicle embodying an axle and an overlying chassis, a resilient suspension device for supporting the chassis from the adjacent axle end embodying: a rocking beam fulcrumed at its center on the chassis and having one end projecting above and across said axle end, a thrust rod interposed between the aforesaid beam and axle ends, a rotary element, and a resilient element connected at one end to the rotary element and at the other end to the other beam end to actuate said rotary element when the beam is rocked in one direction.

4. In a vehicle embodying an axle and an overlying chassis, a resilient suspension device for supporting the chassis from the adjacent axle end embodying: a rocking beam fulcrumed at its center on the chassis and having one end projecting above and across said axle end, a thrust rod interposed between the aforesaid beam and axle ends, a rotary cam, and an element connected at one end to the cam and at the other end to the other beam end to rotate said cam when the beam is rocked in one direction.

5. In a vehicle embodying an axle and an overlying chassis, a resilient suspension device for supporting the chassis from the adjacent axle end embodying: a rocking beam fulcrumed at its center on the chassis, a thrust rod interposed between one end of the beam and the aforesaid adjacent axle end, a rotary member, means for imparting an initial rotary adjusting movement thereto, an element rotatable with said rotary member, and a connection between said rotatable element and the other end of the beam to rotate the former when the beam is rocked in one direction.

6. In a vehicle embodying an axle and an overlying chassis, a resilient suspension device for supporting the chassis from the adjacent axle end embodying: a rocking beam fulcrumed at its center on the chassis, a thrust rod interposed between one end of the beam and the aforesaid adjacent axle end, a rotary member, means for imparting an initial rotary adjusting movement thereto, a cam rotatable with said rotary member, and a connection between said cam and the other end of the beam to rotate the former when the beam is rocked in one direction.

7. In a vehicle embodying an axle and an overlying chassis, a resilient suspension device for supporting the chassis from the adjacent axle end embodying: a rocking beam fulcrumed at its center on the chassis and having one end projecting above and across said axle end, a thrust rod interposed between the aforesaid beam and axle ends, a rotary cam, and a resilient connection between said cam and the other beam end to rotate said cam when the beam is rocked in one direction.

In testimony whereof I affix my signature.

LOUIS GRANGES.